United States Patent [19]
Kaku et al.

[11] Patent Number: 5,629,913
[45] Date of Patent: May 13, 1997

[54] OPTICAL DISK RECORDING CONTROL METHOD AND APPARATUS FOR RECORDING USER DATA BASED ON TEST SIGNAL

[75] Inventors: Toshimitsu Kaku, Sagamihara; Masahiko Ishimaru, Odawara, both of Japan

[73] Assignee: Hitachi, Ltd., Tokyo, Japan

[21] Appl. No.: 612,328

[22] Filed: Mar. 7, 1996

[30] Foreign Application Priority Data

Mar. 10, 1995 [JP] Japan ..................................... 7-051238

[51] Int. Cl.⁶ ..................................................... G11B 7/00
[52] U.S. Cl. ........................ 369/54; 369/116; 369/59
[58] Field of Search ............................. 369/54, 116, 58, 369/59, 48, 121, 13

[56] References Cited

U.S. PATENT DOCUMENTS

| | | | |
|---|---|---|---|
| 5,226,027 | 7/1993 | Bakx | 369/58 |
| 5,249,172 | 9/1993 | Hagihara et al. | 369/48 X |
| 5,268,893 | 12/1993 | Call et al. | 369/116 |
| 5,341,360 | 8/1994 | Johann et al. | 369/54 X |
| 5,365,507 | 11/1994 | Fuji et al. | 369/116 |
| 5,537,381 | 7/1996 | Fuji | 369/116 |

FOREIGN PATENT DOCUMENTS 6-231463  8/1994  Japan .

*Primary Examiner*—Thang V. Tran
*Attorney, Agent, or Firm*—Fay, Sharpe, Beall, Fagan, Minnich & McKee

[57] ABSTRACT

An optical disk recording control apparatus includes a judgment circuit for judging a modulation system of user information in accordance with identification information possessed by the optical disk and outputting a control signal concerning the modulation system, a test write pattern generating circuit for generating a test write pattern constituted by the densest and sparsest patterns correspondingly to the code configuration of the identified modulation system, a test write pulse recording circuit for generating a test write pulse string from the test write pattern and recording the test write pulse string in a predetermined zone of the optical disk, an optimum recording power calculation circuit for obtaining optimum recording power for the predetermined zone on the basis of a densest pattern waveform and a sparsest pattern waveform so that the zero level of the densest pattern waveform coincides with the zero level of the sparsest pattern waveform in the test write pulse string recorded in the predetermined zone, and a user information recording circuit for recording the user information into each zone of the optical disk correspondingly to the obtained optimum recording power in accordance with the modulation system, whereby the different modulation system test writing is performed in accordance with the identification information possessed by the optical disk and then the user information is recorded into the optical disk.

14 Claims, 9 Drawing Sheets

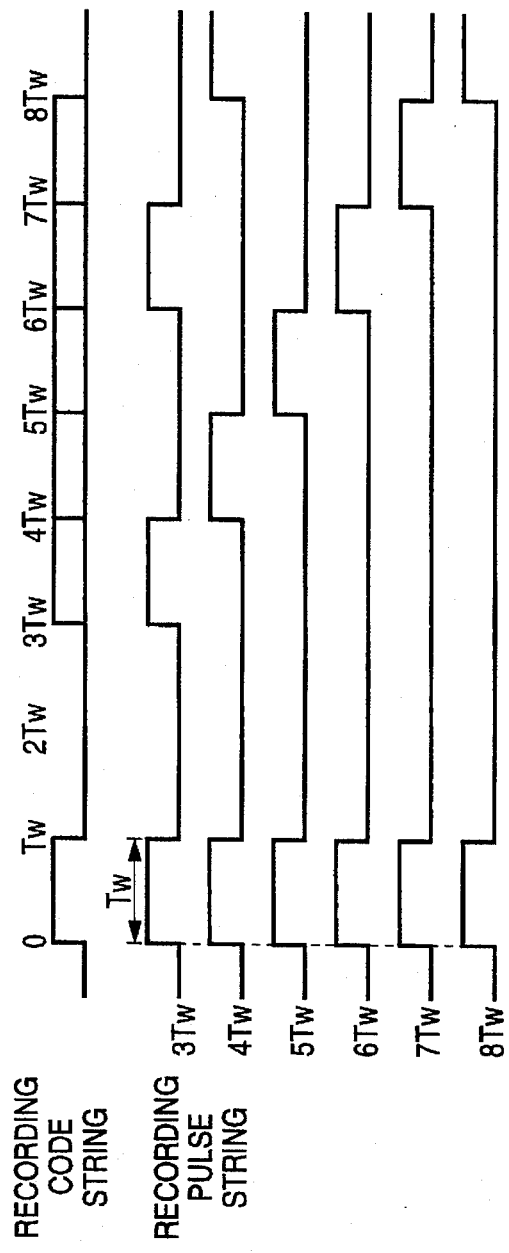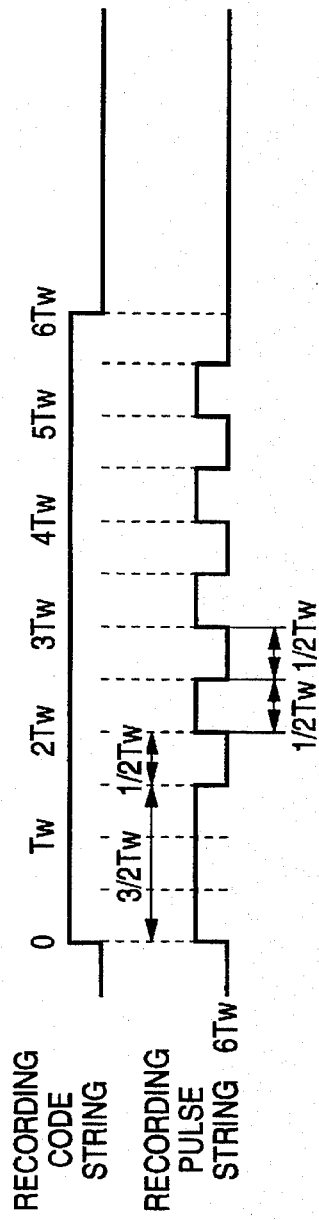

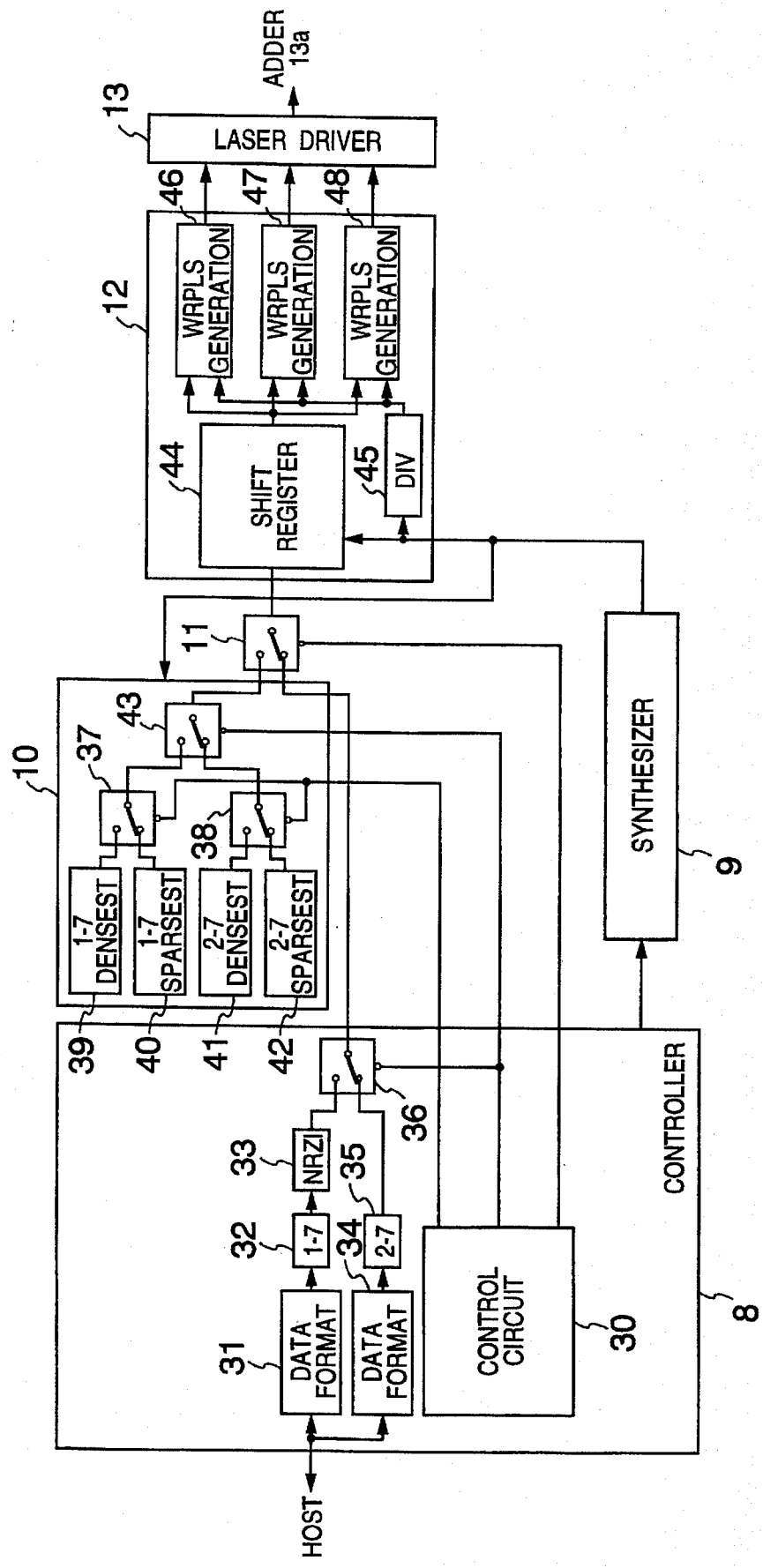

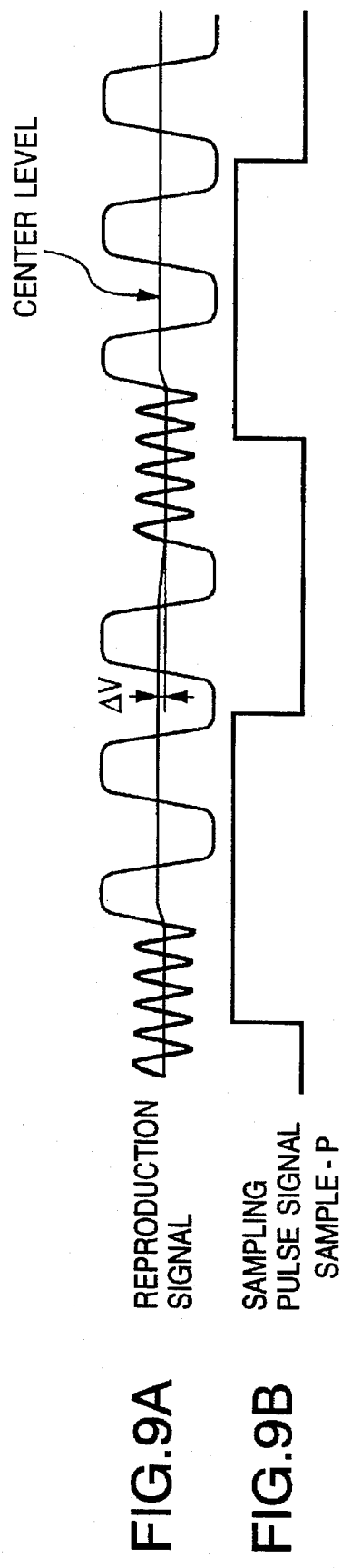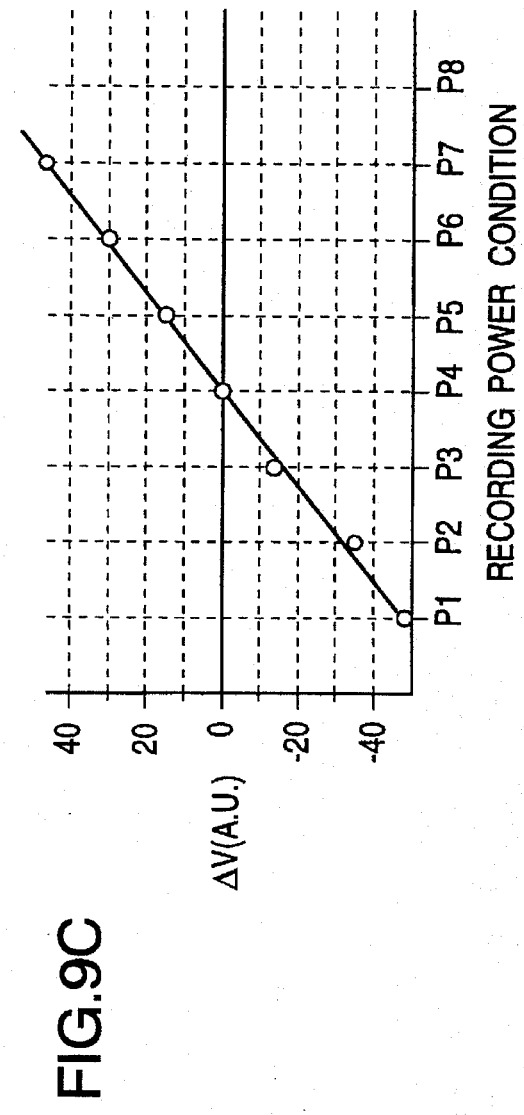
FIG.9A
FIG.9B
FIG.9C

OPTICAL DISK RECORDING CONTROL METHOD AND APPARATUS FOR RECORDING USER DATA BASED ON TEST SIGNAL

BACKGROUND OF THE INVENTION

The present invention relates to a method of controlling and recording of a rewritable optical disk such as a magneto-optical disk, a phase-change type optical disk, or the like, and an optical disk device using such an optical disk. Particularly, the present invention relates to a method of controlling and recording of an optical disk in which high-accurate recording control of recording marks is required, and an optical disk device using such an optical disk.

In the optical disk device of such a type, there is known a technique in which test writing is performed before start of normal recording to thereby determine optimum power to cope with the fluctuation in recording sensitivity with respect to a recording medium due to the variations in film thickness of the recording medium and changes in environmental temperature.

In a test writing control technique due to pit position recording using a 2–7 RLL modulation system as disclosed in JP-A-6-231463, only the densest pattern formed by the normal data modulation system is recorded with power changed, and the amplitude of a signal is measured while the recorded sector is reproduced, so that recording power to maximize the amplitude is used as optimum power.

SUMMARY OF THE INVENTION

An object of the present invention is to avoid the increase of the scale of a circuit system for test writing even in the case where recording control adapted to two different modulation systems is performed, that is, for example both pit position recording and pit edge recording are employed, by means of one apparatus.

Another object of the present invention is to suppress the changes of recording marks due to the environmental changes, or the like, as extremely as possible to thereby perform high-accurate recording mark control.

According to a first aspect of the present invention, there is provided an optical disk recording control method in which test write data are written as test writing in an optical disk so that user information is recorded in the optical disk on the basis of a result of the test writing, the method comprising the steps of: judging identification information possessed by the optical disk for identifying either one of first and second modulation systems of the user information; generating a test write pattern constituted by the densest and sparsest patterns corresponding to a code configuration of the identified one of the first and second modulation systems; generating a test write pulse string from the test write pattern and recording the test write pulse string in a predetermined zone of the optical disk; obtaining optimum recording power for the predetermined zone on the basis of a densest pattern waveform and a sparsest pattern waveform so that the center level of the densest pattern waveform coincides with the center level of the sparsest pattern waveform in the test write pulse string recorded in the predetermined zone; and recording the user information into each zone of the optical disk correspondingly to the obtained optimum recording power in accordance with the identified one of the first and second modulation systems.

According to a second aspect of the present invention, there is provided an optical disk recording control apparatus in which test write data are written as test writing in an optical disk so that user information is recorded in the optical disk on the basis of a result of the test writing, the apparatus comprising: a judgment unit for judging a modulation system of user information in accordance with identification information possessed by the optical disk, and outputting a control signal concerning the modulation system; a test write pattern generating unit for generating a test write pattern constituted by the densest and sparsest patterns correspondingly to a code configuration of the identified modulation system; a test write pulse recording unit for generating a test write pulse string from the test write pattern and recording the test write pulse string in a predetermined zone of the optical disk; an optimum recording power calculation unit for obtaining optimum recording power for the predetermined zone on the basis of a densest pattern waveform and a sparsest pattern waveform so that the center level of the densest pattern waveform coincides with the center level of the sparsest pattern waveform in the test write pulse string recorded in the predetermined zone; and a user information recording unit for recording the user information into each zone of the optical disk correspondingly to the obtained optimum recording power in accordance with the modulation system.

Test writing means an operation in which a recording mark is written in a predetermined position of a recording medium in advance before recording of normal information so that the variation in film thickness of the recording medium, or the like, caused by the exchange of the recording medium and the variation in recording sensitivity with respect to the recording medium, or the like, caused by the change in environmental temperature and the fluctuation in characteristic of a recording apparatus are detected in order to improve the adaptability between the recording medium and the recording apparatus. Further, in order to find optimum recording power from a reproduction signal obtained from recorded test write data, the recording operation is carried out while light intensity or energy of recording waveform is changed.

Further, test write data is constituted by a combination of the densest pattern and the sparsest pattern so that, for example, a recording pulse string of the maximum frequency in a recording pulse string in accordance with pit position recording is used for recording the densest pattern and that a recording pulse string generated from a data pit string having a frequency of not higher than ¼ as high as the frequency of the densest pattern for the purpose of pit edge recording is used for recording the sparsest pattern. Further, in a reproduction signal of test write data, the center level of the densest pattern and the center level of the sparsest pattern are detected, and recording power to make the two center levels equal is set as optimum recording power.

By this countermeasure, optimum recording power for pit position recording can be set securely. Further, in test writing for pit edge recording, the center level of the densest pattern and the center level of the sparsest pattern are detected in a reproduction signal, and recording power to make the two center levels equal can be set as optimum recording power by using a pattern of repetition of the densest pattern and the sparsest pattern formed by a normal data modulation system in the same manner as that disclosed in the above U.S. patent application Ser. No. 08/091,033 field on Jul. 13, 1993 by Kirino et al, the contents of which are incorporated herein by reference. Accordingly, the reproducing system in the test writing process can be used to be common to pit position recording (2–7 RLL modulation system) and pit edge recording (1–7 RLL modulation system). As a result, test writing in accordance with two different modulation systems can be performed by one optical disk device without any increase of the scale of the circuit system for test writing.

BRIEF DESCRIPTION OF THE DRAWINGS

FIG. 2A is a pulse waveform view showing code configuration due to RLL(2,7) mark position modulation;

FIG. 2B is a pulse waveform view showing the sparsest pattern of test write patterns used in the optical disk recording control apparatus according to the present invention;

FIG. 3 is a partly detailed block diagram showing the optical disk recording control apparatus depicted in FIG. 1;

FIG. 9A is an explanatory view showing the zero level or center level of the densest pattern waveform and the sparsest pattern waveform;

FIG. 9B is a waveform view showing sample pulses of the waveform shown in FIG. 9A; and FIG. 9C is a graph view showing the relation between the recording power condition and the difference between the densest pattern waveform and the sparsest pattern waveform.

DESCRIPTION OF THE PREFERRED EMBODIMENTS

Figure 1:
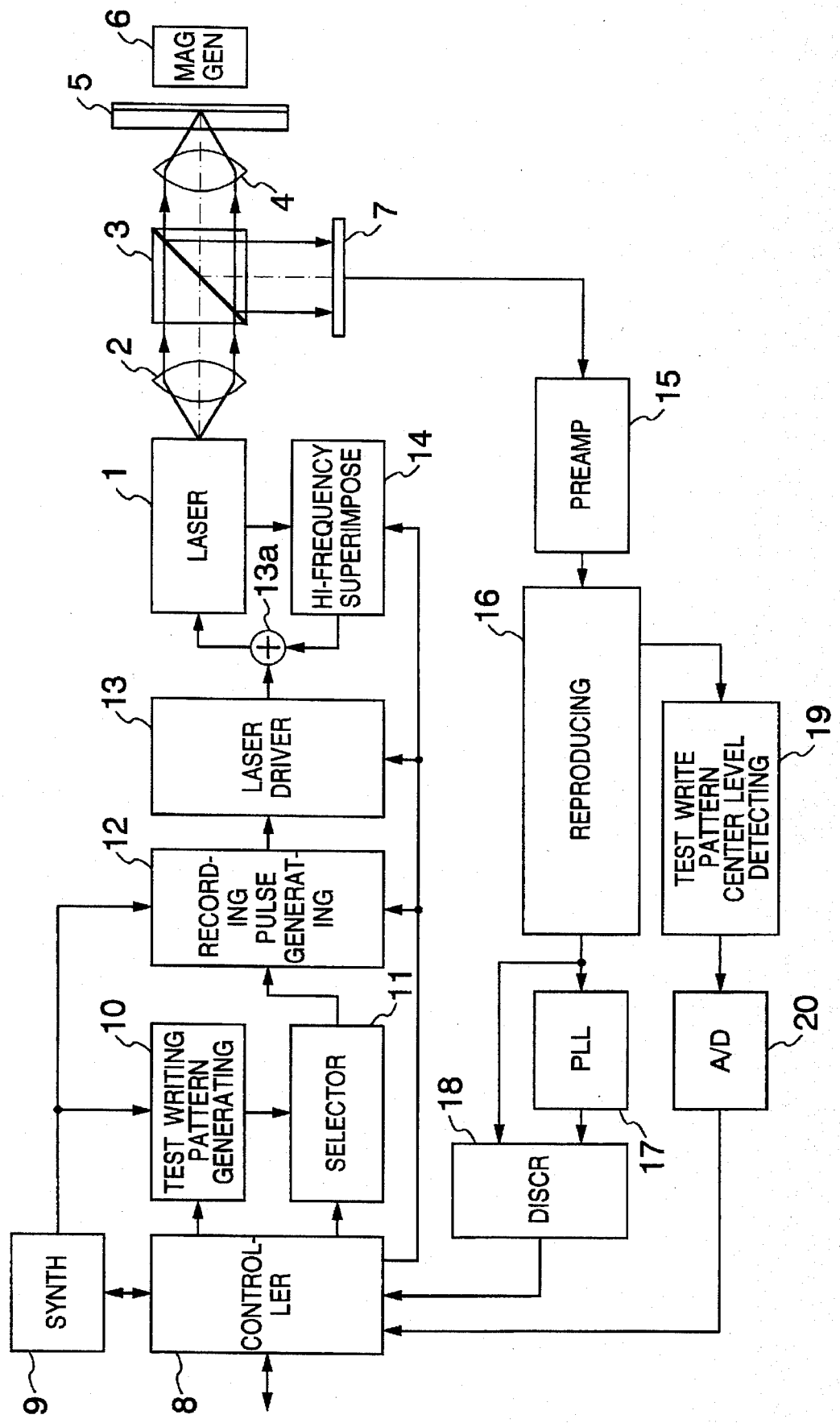
FIG. 1 is a block diagram showing an optical disk recording control apparatus according to the present invention.

The present invention will be described below in detail on the basis of embodiments shown in the drawings.

FIG. 1 is a diagram showing the configuration of a magneto-optical disk device according to a first embodiment of the present invention. In this embodiment, the magneto-optical disk device comprises: an optical head including a laser (laser emitting source); a recording medium (magneto-optical disk) for recording information; a recording system including a recording pulse generating circuit; a reproducing system including a reproducing circuit for transforming a reproduction signal obtained from the optical head into information; a controller system; and so on.

In FIG. 1, the reference numeral 1 designates a laser (laser emitting source); 2, a first lens; 3, a beam splitter; 4, a second lens; 5, a recording medium (magneto-optical disk) composed of a recording film, and a substrate for supporting the recording film; 6, an external magnetic field generator; 7, a photo-detector; 8, a controller for supervisorily controlling the device; 9, a synthesizer; 10, a test write pattern generating circuit; 11, a selector; 12, a recording pulse generating circuit; 13, a laser driver; 14, a high-frequency superimposing circuit; 15, a preamplifier; 16, a reproducing circuit; 17, a PLL; 18, a discriminating circuit; 19, a test write pattern center level detecting circuit; and 20, an A/D converter.

First, in the configuration shown in FIG. 1, the controller 8 has a micro-computer which judges from information pre-recorded in the PEP (Phase Encoding Part) zone of the recording medium 5 whether information was recorded by RLL(2,7) mark position modulation or by RLL(1,7) mark edge modulation or whether the recording format is of a CAV (Constant Angular Velocity) type or of a ZCAV (Zoned Constant Angular Velocity) type. Accordingly, the magneto-optical disk device according to the present invention can use two modulation systems, RLL(2,7) mark position modulation and RLL(1,7) mark edge modulation, and two formats CAV and ZCAV. The controller 8 selects a test write pattern in accordance with the judged modulation system through the test write pattern generating circuit 10, selects user information in accordance with the modulation system and feeds the test write pattern and the user information to the selector 11. The synthesizer 9 is an oscillator for generating a reference clock signal for controlling recording and reproducing of the magneto-optical disk device. The synthesizer 9 generates the reference clock signal in accordance with the judged recording format so that the reference clock signal is changed in accordance with the zone of the recording medium. In the case of CAV, one clock signal is generated. In the case of ZCAV, clock signals of the number corresponding to the number of zones are generated.

Test writing is an operation of pre-writing of a test write pattern in a predetermined position of the recording medium 5 before recording of normal user information in order to improves the adaptability of the recording medium 5 to the magneto-optical disk device for recording and in order to detect the change of the film thickness of the recording medium 5 due to the exchange thereof, the change of environmental temperature, the change of recording sensitivity of the recording medium 5 due to the characteristic change of the magneto-optical disk device, and so on. As a test write pattern to be recorded, a pattern in accordance with the modulation system is selected in the test write pattern generating circuit 10. This circuit will be described later in detail.

FIGS. 2A and 2B show an example of user information and test write pattern recorded on the recording medium 5 and applied to this embodiment. Here, a test writing will be described in the case where RLL(2,7) mark position modulation is employed. That is, it is assumed that the controller 8 selects a data modulation system and a test write pattern concerning RLL(2,7) mark position modulation. FIG. 2A shows a data code and a recording pulse string at the time of RLL(2,7) mark position modulation.

This data code is sent out from the selector 11 in accordance with user information after modulation in accordance with the modulation system. Further, the recording pulse string corresponds to pulses after the data code is transformed in order to generate a desired laser driving current from the recording pulse generating circuit 12. In this occasion, the data code and the recording pulse string have the same pulse format in which the pulse width is Tw and in which there are six pulse interval patterns of 3 Tw to 8 Tw. The pulse width Tw expresses data "1" corresponding to a mark (round domain in the case of a magneto-optical disk) in mark position recording. Here, Tw is a pulse width equal to the width of a data discriminating window and also equal to the period Tw of a reference clock signal oscillated by the synthesizer 9. As a densest pattern of test write patterns, there is used a pulse string having the pulse interval of 3Tw which is the highest frequency of user information. As a sparsest pattern of test write patterns as will be described later, a mark edge recording pattern is used taking into account the use of the circuit and test writing process in common to RLL(2,7) mark position modulation and RLL (1,7) mark edge modulation. In FIG. 2B, as an example, there is employed a data code which is obtained by NRZI-transformation of a 6Tw-interval data code RLL(2,7)-modulated and which corresponds to mark edge recording in a 6Tw pulse width and at a 12Tw interval. In the sparsest pattern, the format of the data code is different from the format of the recording pulse string because the mark is constituted by a long hole. The pulse string generated at the time of the sparsest pattern is a pulse string which is generated in the same manner as in RLL(1,7) mark edge modulation and which is constituted by a leading pulse having a pulse width of 3/2Tw and a gap width of ½Tw, and four backward pulses each having a pulse width of ½Tw and a gap width of ½Tw. The data code used for test writing is generated by the test write pattern generating circuit 10 and then the recording pulse string is generated by the recording pulse generating circuit 12 following the test write pattern generating circuit 10 (various pulse strings inclusive of recording pulse strings are shown in detail in FIGS. 4 and 5). The recording pulse string is generated in synchronism with the reference clock signal.

In the case of use of a recording medium in which recording has been performed by RLL(1,7) mark edge modulation, the controller 8 selects user information and a test write pattern in accordance with RLL(1,7), executes test writing into the recording medium 5 on the basis of the user information and test write pattern and obtains optimum laser power on the basis of the test writing process. The test writing and user information recording concerning RLL(1,7) mark edge modulation have been described in U.S. patent application Ser. No. 08/091,003.

The area (track) used for test writing is defined by optical disk standardization. The configuration may be made so that test writing is executed in the specific area when a standardized recording medium is used, and that a manufacturer zone provided in the innermost or outermost circumference portion of a recording medium is used when the recording medium is not standardized. For example, in the case of a recording medium in which such a manufacturer zone is present only in the innermost circumference portion, test writing is executed at the one place to obtain optimum power so that optimum recording power suitable for recording of user information on the whole of the recording medium is obtained on the basis of the obtained optimum power. In the case where manufacturer zones are provided in the two places of the innermost and outermost circumference portions, test writing is performed in the two places to obtain optimum power so that optimum recording power suitable for recording user information on the whole of the recording medium is obtained, for example, by performing interpolation on the basis of the obtained optimum power.

Next, writing of a test write pattern will be described as an embodiment in the case where a manufacturer zone as the aforementioned test write area (track) is present only in the innermost circumference portion.

Figure 5:
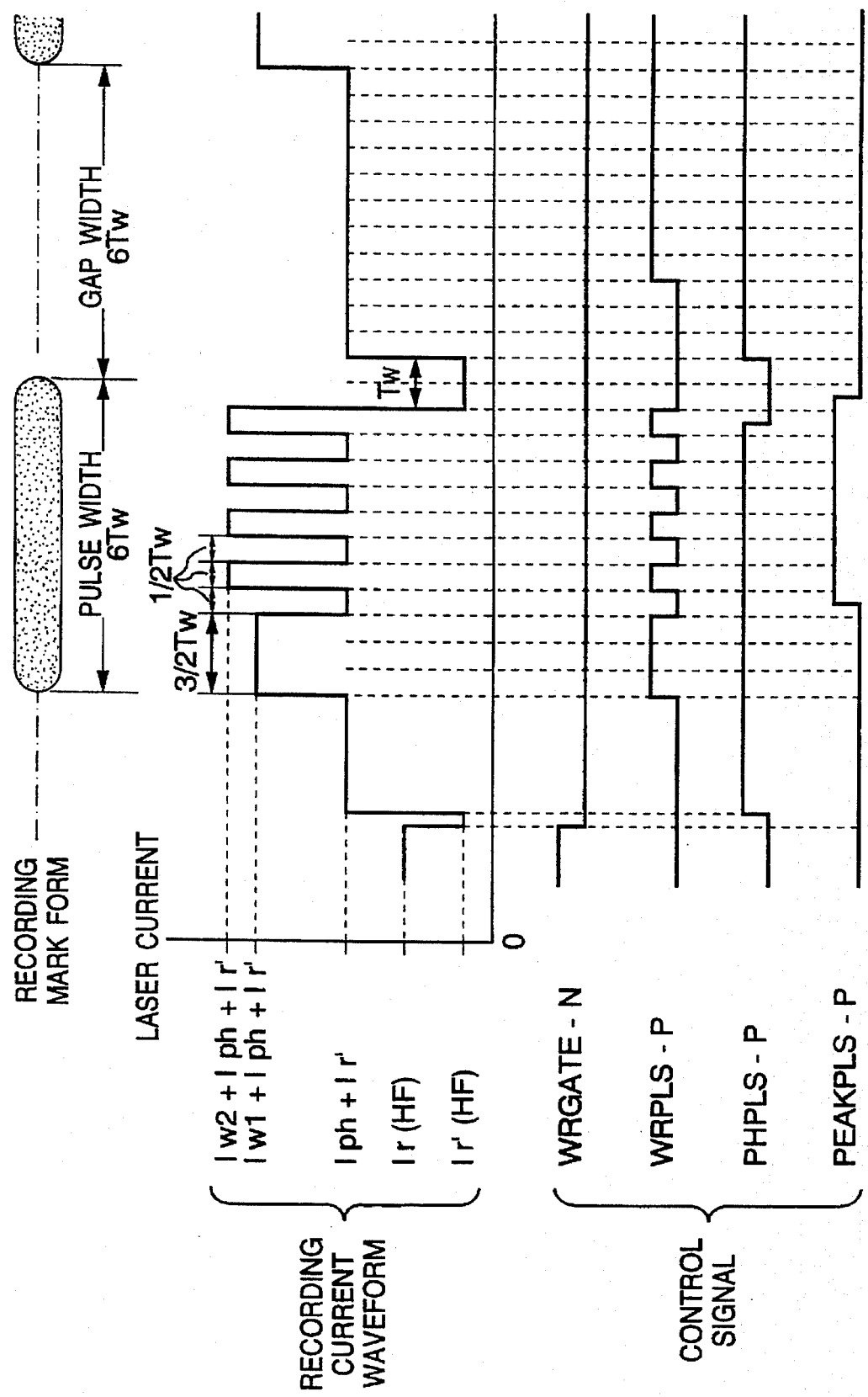
FIG. 5 is an explanatory view of pulses showing the sparsest pattern of the test write patterns.

When the selector 11 receives a test write pattern and user information to be recorded, and selects the test write pattern on the basis of a control signal of the controller 8, the test write pattern is fed from the selector 11 to the recording pulse generating circuit 12. In the recording pulse generating circuit 12, a pulse string having a test write pattern composed of the densest pattern expressed by a recording pulse string 3Tw in FIG. 2A and the sparsest pattern expressed by a recording pulse string 6Tw in FIG. 5 is generated and fed to the laser driver 13. The laser driver 13 high-output-oscillates the laser 1 at a recording current. Light from the laser 1 is collimated by the first lens 2 and converged on the recording medium 5 by the second lens 4 through the beam splitter 3, so that a recording mark corresponding to the pulse string is recorded in the manufacturer zone of the recording medium 5. The high-frequency superimposing circuit 14 provided to reduce laser noise caused by the laser 1 may stop high-frequency superimposing in order to elongate the life of the laser at the time of recording/erasing. The recording pulse generating circuit 12 is a circuit which generates both the codes of RLL(2,7) mark position modulation and RLL(1,7) mark edge modulation in the recording pulse and which will be described later.

Figure 4:
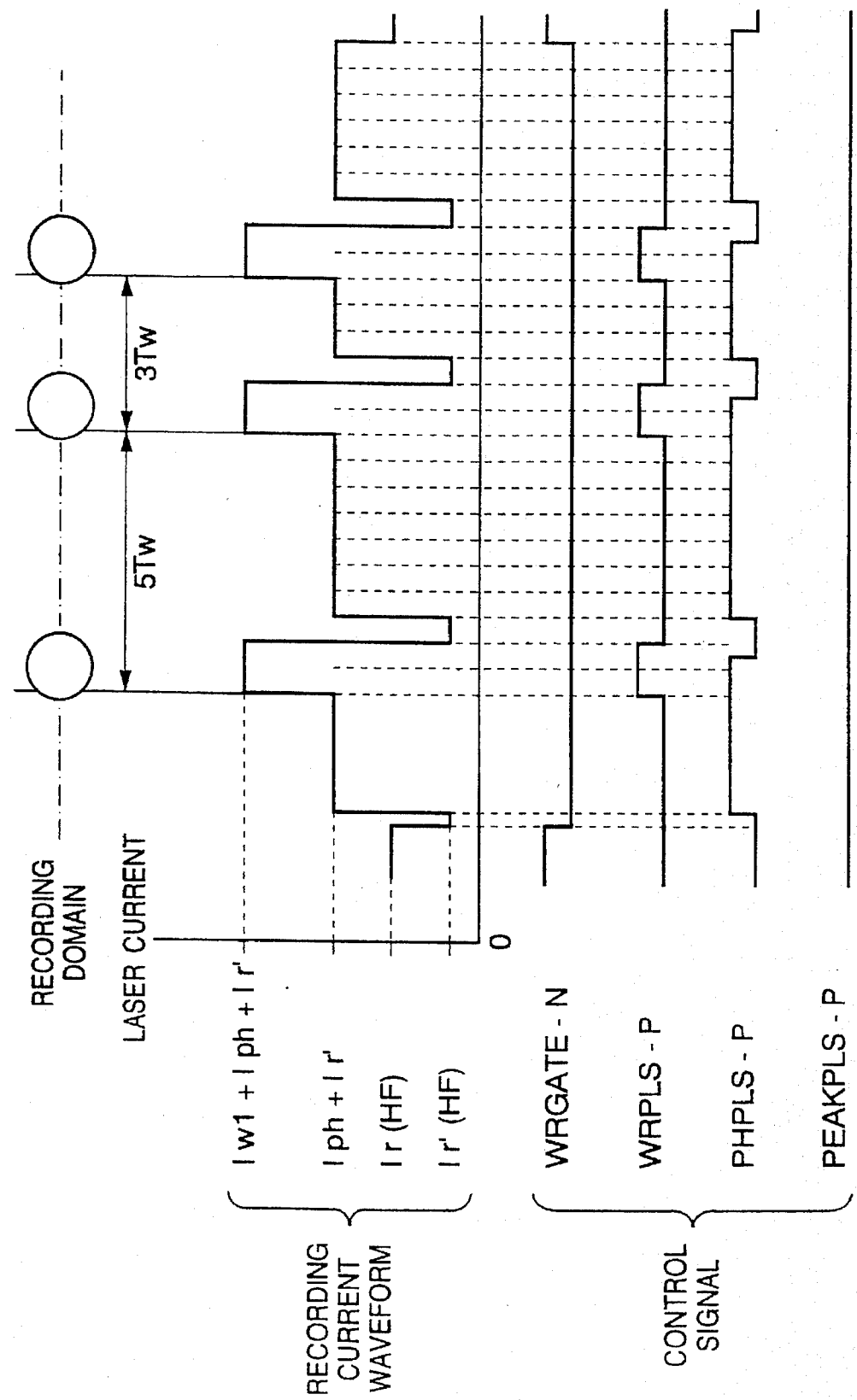
FIG. 4 is an explanatory view of pulses showing the densest pattern of the user information by RLL(2, 7) wark position modulation.

Next, reproduction of the test write pattern will be described. The test write pattern is fed to the reproducing circuit 16 via the second lens 4, the photo-detector 7 and the preamplifier 15. Further, an analog-state reproduction signal of the test write pattern is fed from the reproducing circuit 16 to the test write pattern center level detecting circuit 19. The test write pattern is constituted by a combination of the densest pattern of the highest frequency and the sparsest pattern of the lowest frequency or near the lowest frequency. That is, as shown in FIGS. 4 and 5, the test write pattern is constituted by a combination of long holes (sparsest pattern) and round holes (densest pattern). In the reproduction signal, for example, the center level (zero level) of the densest pattern waveform and the center level (zero level) of the sparsest pattern are detected by the test write pattern center level detecting circuit 19 as shown in FIG. 9 to thereby obtain a difference between the two center levels. The difference is converted into a digital signal by the A/D converter 20, so that the digital signal is fetched into the controller 8. In the controller 8, laser power to make the difference between the two center levels "zero" is calculated and determined as optimum recording power. The optimum recording power thus determined first for the manufacturer zone forms the base for determining optimum recording power for each zone of the recording medium 5, that is, optimum recording power for each zone can be obtained by increasing the first determined optimum recording power by predetermined power as the position of the zone moves toward the outermost circumference. With the optimum recording power thus obtained for each zone, user information is recorded in the recording medium 5.

Figure 7:
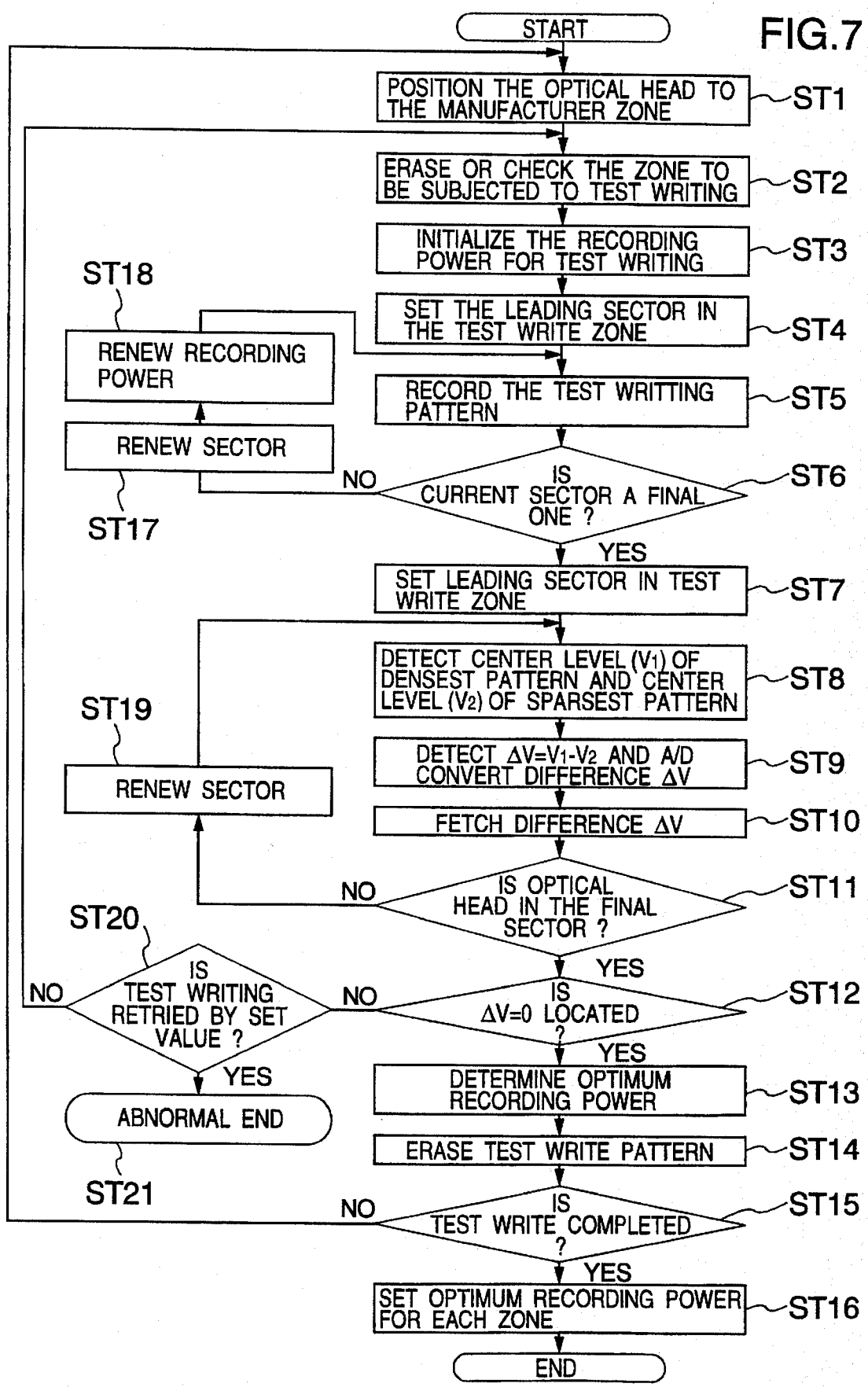
FIG. 7 is a flow chart showing part of an optical disk recording control method according to the present invention.

The process for obtaining optimum recording power is substantially common to RLL(1,7) mark edge modulation and RLL(2,7) mark position modulation, except a difference therebetween in the number of turns for executing the process correspondingly to the number of zones (for example, one place in the innermost circumference, two places in the innermost and outermost circumferences or three in the innermost, intermediate and outermost circumferences) for executing test writing. Accordingly, the process of executing test writing only for the manufacturer zone of the innermost circumference in this embodiment will be described with reference to FIG. 7. In step ST1, the optical head is positioned to the manufacturer zone. In step ST2, a zone to be subjected to test writing is erased or checked. In step ST3, recording power for test writing is initialized. In step ST4, the leading sector in the test write zone is set. In step ST5, the sparsest pattern shown in FIG. 2B and the densest pattern of 3Tw shown in FIG. 2A are written in the leading sector by the optical head via the test write pattern generating circuit 10, the recording pulse generating circuit 12 and the laser driver 13. In step ST6, a judgment is made as to whether the current sector is the final sector in the test write zone or not. If the current sector is not the final sector, the current sector is updated to the next sector in step ST17 and then the test write pattern is recorded in the next sector with recording power increased in step ST18. If the judgment of the final sector is given by the step ST6, the optical head is positioned to the leading sector in order to record the test write pattern in step ST7. In steps ST8 and ST9, a difference between the center level of the densest pattern and the center level of the sparsest pattern is obtained by the test write pattern center level detecting circuit 19. Then, in step ST10, the difference thus obtained is fetched into the controller 8 and, in step ST11, a judgment is made again as to whether the position of the optical head is in the final sector or not. If it is not in the final sector, the optical head is moved to the next sector position in step ST19 and then the situation of the routine goes back to the step ST8 in order to obtain a difference between the center level of the densest pattern and the center level of the sparsest pattern in the next sector. If the position of the optical head is in the final sector in the step ST11, a judgment is made in step ST12 as to whether the controller 8 has obtained values of the densest and sparsest patterns to make the center level "zero" or not. If no such values have been obtained, a judgment is made in step ST20 as to whether test writing is to be tried again or not, or by a set value or not. If test writing is to be retried not by a set value, the situation of the routine goes back to the step ST2, otherwise goes to the step ST21 to terminate as abnormal end. If the values of the densest and sparsest patterns to make the center level "zero" are obtained in the step S12, the values thus obtained in the step S12 are determined as optimum recording power in step ST13. In step ST14, the test write pattern is erased. In step ST15, a judgment is made as to whether the test writing is completed or not. If the test writing is not completed, the situation of the routine goes back to the step ST1. If the test writing is completed in the step ST15, optimum recording power for each zone is set in step ST16 and then the test writing is terminated.

Incidentally, it is assumed that user information in the test write zone has been entirely cleared when the optical head is positioned for test writing in the step ST1. If there is any user information recorded, the user information is erased by the optical head. Erasing power used in this occasion is preferably set to standard power taking into account the erasing strength of the recording film of the recording medium 5. For example, recording power for test writing is initialized to 50° C. recording power.

Then, user information determined by RLL (2,7) mark position modulation is recorded in the recording medium 5 with optimum recording power set as described above for each zone. The detailed description of the recording operation in this occasion will be omitted because the description of the recording operation is substantially equal to the description of the test writing operation. In the case where user information due to RLL(1,7) mark edge modulation is to be recorded in a user zone after optimum recording power is obtained by execution of test writing due to RLL(1,7) mark edge modulation as described in U.S. patent application Ser. No. 08/091,033, the controller 8 identifies the user information and records the user information via the selector 11, the recording pulse generating circuit 12, the laser driver 13, the laser 1 and the optical head including the first lens 2, the beam splitter 3 and the second lens 4. Although test writing and calculation of optimum recording power due to RLL(1,7) mark edge modulation can be executed by the technique described in U.S. patent application Ser. No. 08/091,033, the circuit configuration shown in FIG. 1 can execute either test writing and user information recording due to RLL(1,7) mark edge modulation or test writing and user information recording due to RLL(2,7) mark position modulation because the controller 8, the test write pattern generating circuit 10, the selector 11 and the recording pulse generating circuit 12 can select either one of the modulation systems of RLL(1,7) mark edge modulation and RLL(2,7) mark position modulation.

Figure 8:
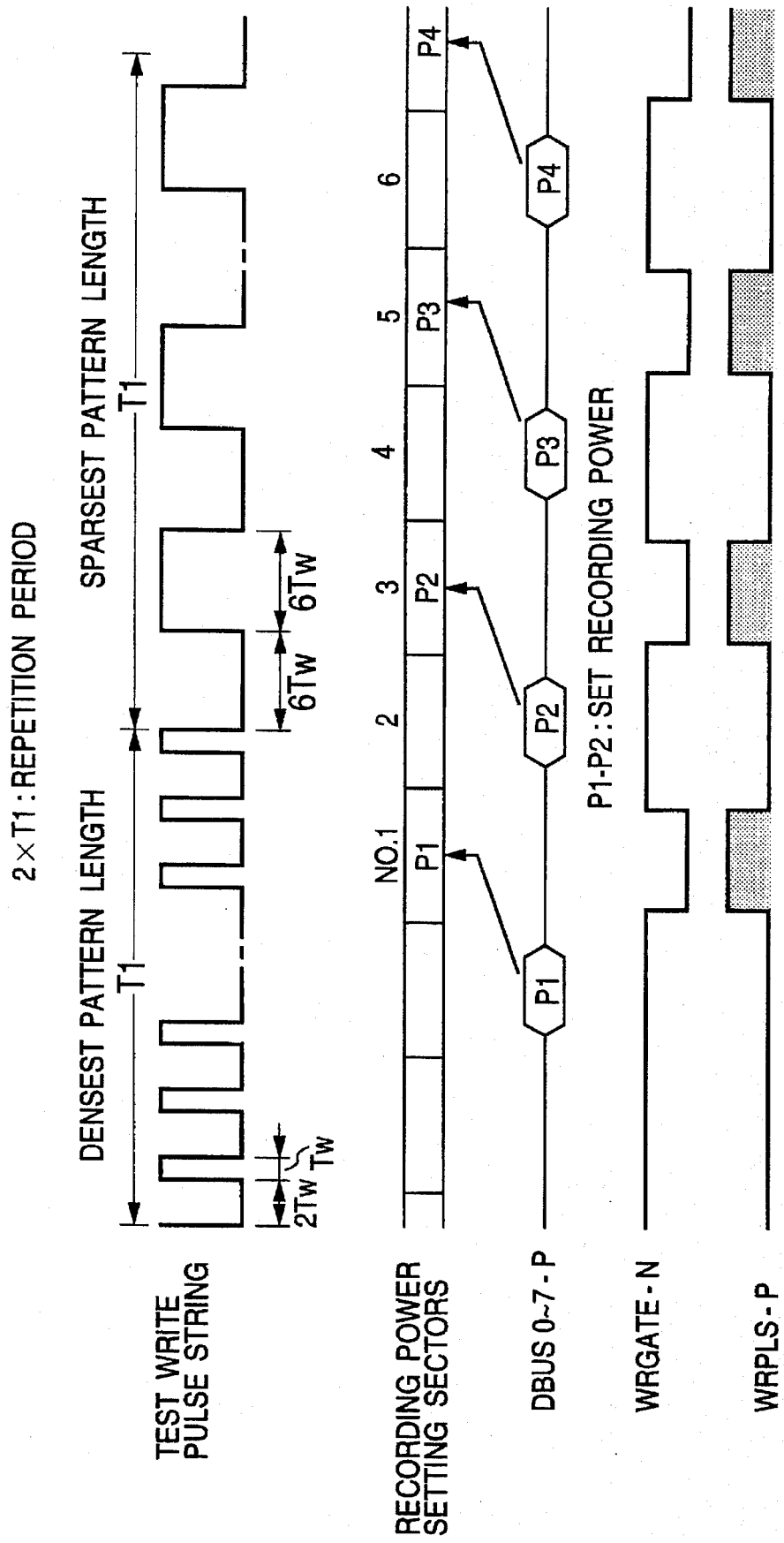
FIG. 8 is an explanatory view showing the relations between a test write pulse string, recording power setting sectors and control signals.

FIG. 3 is a detailed circuit diagram showing the controller 8, the test write pattern generating circuit 10, the selector 11 and the recording pulse generating circuit 12. Describing each circuit, first, the controller 8 has: a control circuit 30 for outputting a densest/sparsest pattern switching signal, a 1–7/2–7 modulation switching signal and a user information/test write pattern switching signal; a data formatting circuit 31 for arranging user information in a predetermined code format due to RLL(1,7) mark edge modulation when input user information has a code configuration due to RLL(1,7) mark edge modulation or RLL (2,7) mark position modulation; a 1–7 modulation circuit 32 for modulating the arranged user information as a code due to RLL(1,7) mark edge modulation; an NRZI transforming circuit 33 for transforming the user information into an NRZI code format; a data formatting circuit 34 for arranging user information in a predetermined code format due to RLL(2,7) mark position modulation when input user information has a code configuration due to RLL(2,7) mark position modulation; and a 2–7 modulation circuit 35 for modulating the arranged user information as a code due to RLL(2,7) mark position modulation. The controller 8 further has a selector 36 for discriminating between the RLL(1,7) mark edge modulation code outputted from the NRZI transforming circuit 33 and the RLL(2,7) mark position modulation code outputted from the 2–7 modulation circuit 35 in accordance with the 1–2/2–7 modulation switching signal given by the control circuit 30. The test write pattern generating circuit 10 has selectors 37 and 38 which are operated on the basis of the densest/sparsest pattern switching signal to generate either a test write pattern composed of the sparsest pattern and the densest pattern due to RLL(2,7) mark position modulation as shown in FIG. 8 or a test write pattern composed of the sparsest pattern and the densest pattern due to RLL(1,7) mark edge modulation in accordance with the method described in U.S. patent application Ser. No. 08/091,033. The selector 37 is connected both to a 1–7 densest pattern generating circuit 39 and to a 1–7 sparsest pattern generating circuit 40 so that either the densest pattern of RLL(1,7) mark edge modulation code or the sparsest pattern of RLL(1,7) mark edge modulation code is outputted in accordance with the densest/sparsest pattern switching signal given by the controller 8. On the other hand, the selector 38 is connected both to a 2–7 densest pattern generating circuit 41 and to a 2–7 sparsest pattern generating circuit 42 so that either the densest pattern of RLL(2,7) mark position modulation code or the sparsest pattern of RLL(2,7) mark position modulation code is outputted in accordance with the densest/sparsest pattern switching signal. Further, the test write pattern generating circuit 10 has a selector 43 which selects a test write pattern by either one of RLL(1,7) mark edge modulation and RLL(2,7) mark position modulation on the basis of the 1–7/2–7 modulation switching signal given by the controller 8 so that any one of the densest pattern in RLL(1,7) mark edge modulation code, the sparsest pattern in RLL(1,7) mark edge modulation code, the densest pattern in RLL(2,7) mark position modulation code and the sparsest pattern in RLL (2,7) mark position modulation code is supplied to the selector 11. The selector 11 supplies the test write pattern determined by the test write pattern generating circuit 10 to the recording pulse generating circuit 12 on the basis of the user information/test write pattern switching signal given by the controller 8, receives user information selected by the selector 36 of the controller 8 and supplies the user information to the recording pulse generating circuit 12. The recording pulse generating circuit 12 fetches either user information or test write pattern into a shift register 44 corresponding to the reference clock signal given by the synthesizer 9 and generates a pulse string as shown in FIGS. 4 and 5 by a combination of the output of the shift register 44 and a clock signal generated by WRPLS generating circuits 46, 47 and 48 and a dividing circuit 45. Describing in detail, because the input pulse width of user information at the time of RLL(2,7) mark position modulation is Tw, the width of the leading pulse of the recording pulse string WRPLS-P is Tw. To achieve desired laser driving, pulse strings PHPLS-P and PEAKPLS-P are generated in accordance with the recording pulse string WRPLS (FIG. 4). Further, because the sparsest pattern (which corresponds to RLL(2,7) mark edge modulation) at the time of test writing in RLL(2,7) mark position modulation and the user information or test write pattern in RLL(1,7) mark edge modulation have an input pulse width of from 2Tw to 8Tw, the leading pulse of the recording pulse string WRPLS-P has a pulse width of 3/2Tw and each of the backward pulses thereof has a pulse width of ½Tw. To achieve desired laser driving, pulse strings PHPLS-P and PEAKPLS-P are generated in accordance with the recording pulse string WRPLS (FIG. 5). These pulse strings are fed to the laser driver 13 which is the next stage. The laser driver 13 drives the laser 1 so that a test write pattern is recorded in the recording medium 5 or user information is recorded in a predetermined zone by the optical head. As described above, the magneto-optical disk device according to the present invention can record both test patterns of RLL(1,7) mark edge modulation and RLL(2,7) mark position modulation and user information in recording media 5 corresponding to the modulation systems.

Referring to FIG. 1, at the time of reproduction, the laser 1 is low-output-oscillated so that light is made incident to the recording medium 5. Light reflected from the recording medium 5 is made incident to the photo-detector 7 while the light path is separated by the beam splitter 3. After photoelectric conversion is then performed by the photo-detector 7, the electric signal is amplified by the preamplifier 15 and supplied to the reproducing circuit 16. The reproducing circuit 16 is composed of a waveform equalizing circuit, an automatic grain control circuit, a two-valuing circuit, and so on. The reproducing circuit 16 converts the input reproduction signal into a two-valued signal. The two-valued signal from the reproducing circuit 16 is supplied to the PLL (Phase Locked Loop) circuit 17 for self-clocking. The reproducing clock signal obtained by the PLL circuit 17 in synchronism with the two-valued signal and the two-valued signal from the reproducing circuit 16 are supplied to the discriminating circuit 18 for discriminating data. As a result, a data discrimination signal is supplied to the controller 8, so that data is demodulated.

In the magneto-optical disk device for recording/erasing information by using external application magnetic field as described in the embodiment, an external magnetic field generator 6 is provided to switch the direction of magnetic field at the time of recording/erasing so that recording/erasing of information is executed by radiating recording/erasing power. Further, at the time of reproduction, reflected light is separated into p-polarization and s-polarization by a wave plate (not shown) arranged in front of the photo-detector 7, and the p-polarization and s-polarization are subjected to differential operation by the photo-detector (halved) 7 to thereby obtain a magneto-optical signal.

FIG. 4 shows the form of a recording mark, the recording current waveform of the laser and control signals. The recording current waveform of the laser is constituted by a combination of recording pulse strings and gaps. A pause period having a certain time width is provided by a recording assisting pulse in the back edge of each recording pulse string. With respect to the recording assisting pulse, a gap portion having a certain time width from the trailing edge position of a recording code string is provided so that heat from the final trailing edge position of a recording pulse string little changes the temperature in the leading edge portion of the next recording pulse string.

First, the case of pit position recording in accordance with information data and the sparsest pattern at the time of test writing will be described. Laser power is set in four power levels. Reproduction power at the time of reproduction is Pr, reproduction power reduced by the degree of modulation in order to stop high-frequency superimposing at the time of recording is Pr', recording power due to a recording assisting pulse is Pph, and recording power of the leading pulse is Pw1. To achieve this power, a recording assisting pulse current source Iph superimposed on current sources Ir', Ir' from APC (Auto Power Control) to keep reproduction power constant, a leading pulse current source Iwl superimposed thereon and a current source Iwr necessary for generating backward pulses are provided as current sources so that a target recording waveform can be obtained by emitting a laser with the current of recording assisting pulse power Pph as Ir'+Iph and with the current of leading pulse power Pw1 as Ir'+Iph+Iwl.

Further, the case of pit edge recording in accordance with the sparsest pattern in test write patterns will be described in FIG. 5. Laser power is set in five power levels by adding power level Pw2 of the backward pulse with respect to pit position recording. Power levels up to Pw1 are as described in connection with FIG. 4. A target recording waveform can be obtained in the same manner as described above by emitting the laser with the current of the backward pulse power Pw2 as Ir'+Iph+Iwl+Iw2.

At the time of reproduction, a reproduction current Ir is achieved by adding Ir' to a current Ihf from the high-frequency superimposing circuit.

Next, control signals at the time of recording will be described. WRGATE-N is a gate signal expressing a recording state and enabled in a recording data area in an ordinary sector. Further, this signal is used as a control signal for turning on/off the high-frequency superimposing circuit 14 to make the high-frequency superimposing circuit 14 turn on at the time of reproduction and turn off at the time of recording. WRPLS-P is a signal which corresponds to recording pulse strings. PHPLS-P is a signal for generating recording assisting pulses. In the rear end of each recording pulse string, this signal has a pause period of Tw/2 in the case of pit position recording or a pause period of Tw in the case of mark edge recording for the purpose of heat insulation. PEAKPLS-P is a control signal used for increasing the power of the backward pulses larger than the power of the leading pulse. These control signals are supplied to the arithmetic circuit 21 in the laser driver 13 shown in FIG. 5.

As control signals at the time of erasing in an apparatus using a recording medium which cannot be subjected to superimposing, data erasing can be made by setting WRPLS-P, PHPLS-P and PEAKPLS-P in the same waveform as WRGATE-P (inverted polarity signal of WRGATE-N signal).

Figure 6:
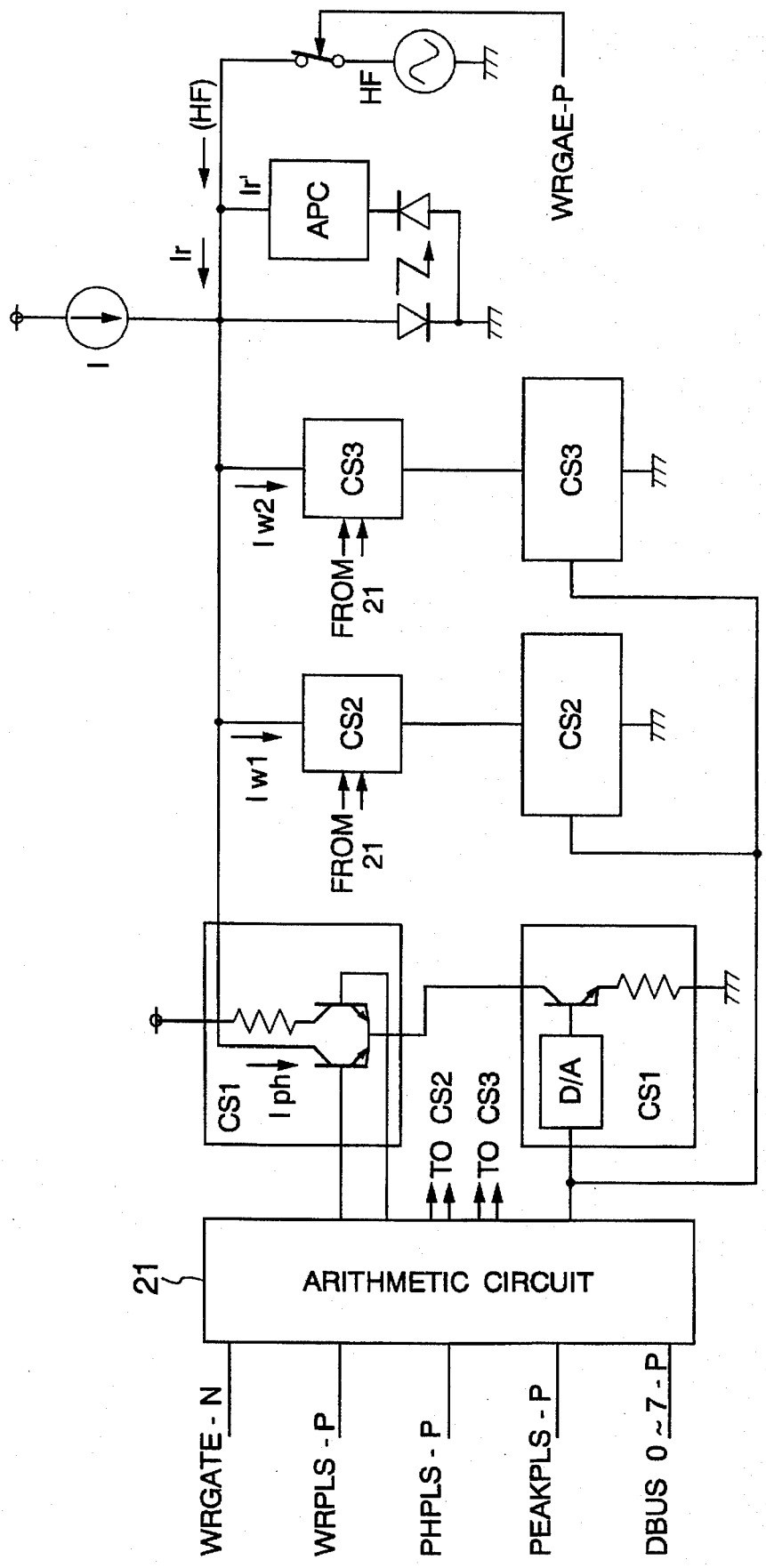
FIG. 6 is a detailed block diagram of the laser driver.

FIG. 6 shows an example of the laser driver 13 for generating laser recording waveforms. With respect to recording current waveforms, current sources Iw1, Iw2 and Iph and a current source Ir' from APC (Auto Power Control) for keeping reproduction power constant are provided. The current sources Iw1, Iw2 and Iph need be set to be variable in each zone in accordance with ZCAV. This can be achieved by setting zone data from the controller 8 to the D/A converter provided in each current source via the arithmetic circuit 21 by data bus DBUS0-7-P. Further, the output gain of the D/A converter is adjusted to obtain predetermined power taking into account the light emitting efficiency of the laser and the efficiency of use of the optical head. For example, the adjustment can be achieved by storing data for the adjustment in an EEPROM in accordance with each D/A converter.

The respective current sources are connected to current switches CS1, CS2 and CS3 by which high-speed switching can be made. Desired recording current waveforms can be obtained by performing high-speed switching on the basis of recording pulse control signals shown in FIGS. 3 and 4. In this circuit, high-speed switchable npn-type transistors instead of pnp-type transistors are used to be adapted for high-speed switching of a "+" drive laser. The summation current of D/A converters provided in respective current sources is made to flow in the current source I by a current mirror circuit (not shown) so that the current is sucked to the current switch side by respective current switches to thereby control the current flowing in the laser. In the case of a "-" drive laser, current control can be achieved by adding up currents from respective current sources by an adder 13a (FIG. 1). The high-frequency superimposing circuit 14 operates to be turned on at the time of reproduction and turned off at the time of recording by the control signal WRGATE-P.

FIG. 8 shows a method of setting recording power of test write patterns outputted from the laser driver 13. As the test write patterns, a pattern of repetition of the densest pattern having a cycle of 3Tw which is the maximum frequency of information code and a pattern of repetition of the sparsest pattern (12Tw cycle, 6Tw pulse width) for performing pit edge recording are used as described above.

The sparsest pattern due to pit edge recording is used as a reference pattern for guaranteeing the amplitude of the densest pattern of information data due to pit position recording. When the densest pattern is equal to the center level of the reproduction signal of the sparsest pattern, the signal amplitude takes its maximum value 1 at nearly 50% duty of the densest pattern. Recording power at this time is made optimum power. In the condition in which one recording power level corresponds to one sector, recording power is updated while the sector is updated successively. It is necessary to set recording conditions to the laser driver 13 via data bus DBUS0-7-P from the controller 8. Taking into account the time required for the setting, data are recorded at least in every other sector (FIG. 8).

Taking into account recording in one track, the number of recording conditions per one process is selected to be from about 5 to about 15. If the period of repetition of one combination of the densest pattern and the sparsest pattern in one sector is selected to be higher than the signal fluctuation at the time of reproduction, a test write pattern signal can be separated from the signal fluctuation so that detecting accuracy can be made high. A main component of the signal fluctuation at the time of reproduction is a frequency component due to retardation possessed by the disk substrate per se. A period not smaller than twice as large as the main period of retardation may be preferably selected as the repetition period of the test write pattern.

The reproducing operation in the test writing process is started from positioning of the optical head to a test write track. Sectors recorded by the aforementioned recording operation with power changed are read out selectively and successively.

In the test write pattern center level detecting circuit 19 in FIG. 1, the center level ($V_1$) of the densest pattern and the center level ($V_2$) of the sparsest pattern are detected from a reproduction signal of each sector, so that a voltage difference $\Delta V = V_1 - V_2$ therebetween is obtained. As the test write pattern center level detecting circuit 19, a combination of a band-pass filter and a sample-hold circuit is used effectively. $\Delta V$ is converted into digital data by the A/D converter 20, so that the digital data are fetched into the controller 8. A recording condition for a sector satisfying the optimum recording power judgment condition $\Delta V = 0$ is found from the digital data.

If there is no sector satisfying $\Delta V = 0$ in this series of process, test writing is executed after the size of the recording condition is judged from the polarity, positive or negative, of $\Delta V$ and recording start power is set again in accordance with the size of the recording condition. If there is no sector satisfying $\Delta V = 0$ though test writing is executed twice or more in one and the same track or in a plurality of tracks, the process is terminated in the form of apparatus abnormality.

After a sector satisfying $\Delta V = 0$ is found, set power for this sector is stored as optimum power in the memory in the controller 8. The test write track in which optimum power has been determined on the basis of test writing as described above is erased for preparation for the next test writing. Erasing power in this occasion is preferably set to maximum recording power used for the test writing to thereby make it possible to erase the test write pattern without remaining.

When optimum power for each zone is calculated by extrapolation on the basis of the optimum power obtained in the inner circumference and stored in the memory, the test writing process is terminated and then recording/reproducing of normal information is started. Further, if the manufacturer zone in the outer circumference portion can be utilized as a test write area, test writing may be performed at the two positions of the inner and outer circumferences so that recording power for each zone can be calculated by interpolation on the basis of optimum power obtained at the respective positions.

FIGS. 9A, 9B and 9C show a reproduction signal obtained in the test writing process and an example of measured results. In the reproduction signal, the difference $\Delta V$ between the center level of the reproduction signal of the densest pattern and the center level of the reproduction signal of the sparsest pattern varies in accordance with the size of recording power. In the test write pattern center level detecting circuit 19, the center level ($V_1$) of the densest pattern and the center level ($V_2$) of the sparsest pattern are detected from the reproduction signal of each sector, so that a voltage difference $\Delta V = V_1 - V_2$ therebetween is obtained. A sampling pulse signal SAMPLE-P is issued from the controller 8 in synchronism with the period of the densest pattern and the sparsest pattern, so that $V_1$ and $V_2$ are detected as the center level of the densest pattern and the center level of the sparsest pattern by the leading edge of the pulse signal and the trailing edge thereof, respectively. As described above, $\Delta V$ may be converted into digital data by the A/D converter 20 so as to be fetched into the controller 8 after ΔV is obtained in the test write pattern center level detecting circuit 19. Alternatively, ΔV=$V_1$-$V_2$ may be obtained in the controller 8 after $V_1$ and $V_2$ are converted into digital data by the A/D converter 20.

FIG. 9C shows an example of measured results of ΔV=$V_1$-$V_2$ in the recording power condition obtained in the test writing process. It is apparent from the graph that recording power is nearly proportional to ΔV.

In the above description, a test writing process for pit position recording using 2-7 RLL modulation has been described. In the embodiment shown in FIG. 1, a test writing process for pit edge recording using 1-7 RLL modulation can be also executed and this is carried out in the same manner as in the aforementioned method disclosed in JP-A-6-36377. That is, a test write pattern generating circuit not shown but used for test writing for pit edge recording is additionally provided to the configuration of FIG. 1 or a test write pattern generating function for bit edge recording is additionally given to the test write pattern generating circuit 10 of FIG. 1 so that the densest pattern and the sparsest pattern formed by the 1-7 RLL modulation system are generated to perform test writing due to a pattern of repetition of the densest pattern and the sparsest pattern in the same manner as in the test writing process for pit position recording. Further, in the reproduction signal, the center level of the densest pattern and the center level of the sparsest pattern are detected so that recording power to make the center levels equal to each other is set as optimum recording power.

Accordingly, a reproducing system (optimum recording power calculating and setting means, and so on) in the test writing process can be used to be common to pit position recording (2-7 RLL modulation system) and pit edge recording (1-7 RLL modulation system), so that test writing adapted for two different modulation systems can be performed by one optical disk device without expanding the scale of the circuit system for test writing process.

Although the above embodiment has shown the case where a magneto-optical disk is used as a recording medium, the present invention can be also applied to a recording control method in the case where a rewritable optical disk such as a phase-change type optical disk, or the like, is used as the recording medium.

What is claimed is:

1. An optical disk recording control method in which test write data are written as test writing in an optical disk so that user information is recorded in said optical disk on the basis of a result of the test writing, said method comprising the steps of:

a) judging identification information possessed by said optical disk for identifying a modulation system of said user information;

b) generating a test write pattern constituted by densest and sparsest patterns corresponding to a code configuration of the identified modulation system;

c) generating a test write pulse string from said test write pattern and recording said test write pulse string in a predetermined zone of said optical disk;

d) obtaining optimum recording power for said predetermined zone on the basis of a densest pattern waveform and a sparsest pattern waveform so that the zero level of the densest pattern waveform coincides with the zero level of the sparsest pattern waveform in said test write pulse string recorded in said predetermined zone; and e) recording said user information into each zone of said optical disk correspondingly to said obtained optimum recording power in accordance with said identification information of the identified modulation system.

2. An optical disk recording control method in which test write data are written as test writing in an optical disk so that user information is recorded in said optical disk on the basis of a result of the test writing, said method comprising the steps of:

a) judging identification information possessed by said optical disk for identifying either one of first and second modulation systems of said user information;

b) generating a test write pattern constituted by densest and sparsest patterns corresponding to a code configuration of the identified one of said first and second modulation systems;

c) generating a test write pulse string from said test write pattern and recording said test write pulse string in a predetermined zone of said optical disk;

d) obtaining optimum recording power for said predetermined zone on the basis of a densest pattern waveform and a sparsest pattern waveform so that the zero level of the densest pattern waveform coincides with the zero level of the sparsest pattern waveform in said test write pulse string recorded in said predetermined zone; and e) recording said user information into each zone of said optical disk correspondingly to said obtained optimum recording power in accordance with the identified one of said first and second modulation systems.

3. An optical disk recording control method according to claim 2, wherein said first and second modulation systems judged by the step a) are identified by said identification information expressing either one of an RLL(1,7) mark edge modulation system and an RLL(2,7) mark position modulation system.

4. An optical disk recording control method according to claim 2, wherein: in said test write pattern generated by the step b), the densest pattern is a round hole and uses a pulse string having a width of 3Tw which is the maximum frequency of the user information when a period of a reference clock pulse signal is represented by Tw; and the sparsest pattern is a long hole and uses a pulse string composed of a leading pulse having a pulse width of 3/2Tw and a gap width of ½Tw and four backward pulses each of which has a pulse width of ½Tw and a gap width of ½Tw.

5. An optical disk recording control method according to claim 2, wherein said predetermined zone in which said test write pulse string is recorded by the step c) is a manufacturer zone on said optical disk so that said test write pulse is recorded in each sector in said manufacturer zone.

6. An optical disk recording control method according to claim 5, wherein the step d) includes the substeps of: obtaining a densest pattern waveform and a sparsest pattern waveform so that the zero level of the densest pattern waveform coincides with the zero level of the sparsest pattern waveform in said test write pulse string recorded in each sector of said manufacturer zone; obtaining optimum recording power for said manufacturer zone on the basis of said waveforms; and calculating optimum recording power for another zone on said optical disk on the basis of said optimum recording power thus obtained.

7. An optical disk recording control apparatus in which test write data are written as test writing in an optical disk so that user information is recorded in said optical disk on the basis of a result of the test writing, said apparatus comprising:

a judgment means connected to an external unit, for judging a modulation system of user information in accordance with identification information possessed by said optical disk, and outputting a control signal concerning said modulation system;

a test write pattern generating means received a code configuration of said modulation system identified by said judgment means, for generating a test write pattern constituted by densest and sparsest patterns correspondingly to the code configuration;

a test write pulse recording means connected to said test write pattern generating means, for generating a test write pulse string from said test write pattern and recording said test write pulse string in a predetermined zone of said optical disk;

an optimum recording power calculation means for obtaining optimum recording power for said predetermined zone on the basis of a densest pattern waveform and a sparsest pattern waveform so that the zero level of the densest pattern waveform coincides with the zero level of the sparsest pattern waveform in said test write pulse string recorded in said predetermined zone by said test write pulse recording means; and a user information recording means connected to said optimum recording power calculation means, for recording said user information into each zone of said optical disk correspondingly to said obtained optimum recording power in accordance with said modulation system.

8. An optical disk recording control apparatus according to claim 7, wherein said judgment means at least includes:

a control circuit which is a controller for making discrimination between RLL(1,7) mark edge modulation and RLL(2,7) mark position modulation on the basis of identification information possessed by said user information received from the outside and possessed by said optical disk;

a data formatting circuit for rearranging said user information of RLL(1,7) mark edge modulation and said user information of RLL(2,7) mark position modulation received from the outside in a predetermined format;

a 1–7 modulation circuit and a 2–7 modulation circuit for modulating said user information of RLL(1,7) mark edge modulation and said user information of RLL(2,7) mark position modulation into an RLL(1,7) mark edge modulation code and an RLL(2,7) mark position modulation code;

an NRZI transforming circuit for transforming said RLL (1,7) mark edge modulation code from said 1–7 modulation circuit into an NRZI code; and a first selector for selecting either said user information due to said RLL(1,7) mark edge modulation code given from said NRZI transforming circuit or said user information due to said RLL(2,7) mark position modulation code given from said 2–7 modulation circuit.

9. An optical disk recording control apparatus according to claim 8, wherein said test write pattern generating means includes:

a second selector for selecting either one of the densest and sparsest patterns in said test write pattern in response to a densest/sparsest pattern switching signal indicating either one of the densest and sparsest patterns in said test write pattern in control signals outputted from said control circuit in accordance with said identification information;

a 1–7 densest pattern generating circuit and a 1–7 sparsest pattern generating circuit for generating the densest pattern and the sparsest pattern respectively as determined for RLL(1,7) mark edge modulation in advance correspondingly to the selection of said second selector;

a 2–7 densest pattern generating circuit and a 2–7 sparsest pattern generating circuit for generating the densest pattern and the sparsest pattern respectively as determined for RLL(2,7) mark position modulation in advance correspondingly to the selection of said second selector; and a third selector connected to said second selector and for outputting a test write pattern constituted by the densest pattern and the sparsest pattern in response to a 1–7/2–7 modulation switching signal for switching over to a densest pattern and sparsest pattern output in either RLL(1,7) mark edge modulation or RLL(2,7) mark position modulation in the control signals outputted from said control circuit correspondingly to said identification information.

10. An optical disk recording control apparatus according to claim 9, wherein: said densest pattern in said test write pattern is a round hole and uses a pulse string having a width of 3Tw which is the maximum frequency of said user information when a period of a reference clock pulse signal is representing by Tw; and the sparsest pattern in said test write pattern is a long hole and uses a pulse string composed of a leading pulse having a pulse width of 3/2Tw and a gap width of ½Tw, and four backward pulses each of which has a pulse width of ½Tw and a gap width of ½Tw.

11. An optical disk recording control apparatus according to claim 9, wherein said test write pattern generating means includes a fourth selector for selectively outputting either one of the test write pattern or the user information in response to a user information/test write pattern switching signal which is outputted from said control circuit and for making switching between the user information outputted from said first selector and said test write pattern outputted from said third selector.

12. An optical disk recording control apparatus according to claim 11, wherein said test write pulse recording means includes:

a shift register for fetching either one of said test write pattern and said user information on the basis of a reference clock signal in response to either one of said test write pattern and said user information outputted from said fourth selector; and three WRPLS generating circuits for generating three pulse waveforms from the fetched test write pattern, generating a pulse string of the sparsest pattern and a pulse string of the densest pattern on the basis of said three pulse waveforms and generating a pulse string of user information on the basis of said modulation system identified from the fetched user information.

13. An optical disk recording control apparatus according to claim 12, wherein said test write pulse recording means uses a manufacturer zone as said predetermined zone to record said test write pulse string, and records said test write pulse string into each sector of said manufacturer zone.

14. An optical disk recording control apparatus according to claim 13, wherein said optimum recording power calculation means includes:

a test write pattern center level detecting circuit for detecting the zero level of the densest pattern waveform and the zero level of the sparsest pattern waveform in the test write pulse string recorded in each sector of the manufacturer zone; and a power calculation means contained in said controller, and for obtaining a densest pattern waveform and a sparsest pattern waveform so that a zero level of the densest pattern waveform whose zero level is detected coincides with the zero level of the sparsest pattern waveform whose zero level is detected, obtaining optimum recording power for said manufacturer zone on the basis of these waveforms, and calculating optimum recording power for another zone of said optical disk on the basis of said obtained optimum recording power.

* * * * *